United States Patent
Hieble et al.

(10) Patent No.: US 11,221,167 B2
(45) Date of Patent: Jan. 11, 2022

(54) INITIALISING SYSTEM FOR A REFRIGERANT COMPRESSOR UNIT AND METHOD FOR INITIALISING A REFRIGERANT COMPRESSOR UNIT

(71) Applicant: BITZER Kuehlmaschinenbau GmbH, Sindelfingen (DE)

(72) Inventors: Tobias Hieble, Gaertringen (DE); John Gibson, Fuerth (DE)

(73) Assignee: BITZER Kuehlmaschinenbau GmbH, Sindelfingen (DE)

( * ) Notice: Subject to any disclaimer, the term of this patent is extended or adjusted under 35 U.S.C. 154(b) by 302 days.

(21) Appl. No.: 16/129,149

(22) Filed: Sep. 12, 2018

(65) Prior Publication Data
US 2019/0017734 A1    Jan. 17, 2019

Related U.S. Application Data (63) Continuation of application No. PCT/EP2016/055466, filed on Mar. 14, 2016.

(51) Int. Cl.
F25B 49/02    (2006.01)
G05B 19/042    (2006.01)

(52) U.S. Cl.
CPC .......... *F25B 49/022* (2013.01); *G05B 19/042* (2013.01); *F25B 2500/26* (2013.01); *G05B 2219/25124* (2013.01)

(58) Field of Classification Search
CPC ... F25B 49/022; F25B 2500/26; G05B 19/042
See application file for complete search history.

(56) References Cited

U.S. PATENT DOCUMENTS

| 7,263,413 B1* | 8/2007 | Hofmann | G05B 15/02 700/19 |
| 2001/0011463 A1* | 8/2001 | Pollrich | F04B 27/0414 62/228.4 |

(Continued)

FOREIGN PATENT DOCUMENTS

| CN | 101655085 A | * | 2/2010 |
| DE | 198 26 169 A1 | | 12/1999 |

(Continued)

OTHER PUBLICATIONS

Zhao, Air compressor monitoring equipment and system thereof, 2009, Full Document (Year: 2009).*

*Primary Examiner* — Elizabeth J Martin
*Assistant Examiner* — Nael N Babaa
(74) *Attorney, Agent, or Firm* — Reinhart Boerner Van Deuren P.C.

(57) ABSTRACT

In order to an initialising system for a refrigerant compressor unit, including a refrigerant compressor, an electrical drive motor for the refrigerant compressor and a compressor controller that determines the voltage and speed of the drive motor on the basis of sets of configuration parameters loaded into this compressor controller and controls the drive motor accordingly, wherein the initialising system has a compressor data memory, in which compressor data relating to respectively possible refrigerant compressors are stored, and a motor data memory, in which motor data relating to possible drive motors are stored, wherein the initialising system has a processor for performing the initialisation, a display unit and an input unit, wherein during initialisation the display unit and the input unit serve to determine the refrigerant compressor and the drive motor, and wherein the processor uses the compressor data of the determined refrigerant compressor and uses the motor data of the determined drive motor to generate compressor configuration param- (Continued)

eters and motor configuration parameters and loads them into the compressor controller for the purpose of operating the drive motor.

16 Claims, 6 Drawing Sheets

(56) References Cited

U.S. PATENT DOCUMENTS

| | | | |
|---|---|---|---|
| 2005/0115255 A1* | 6/2005 | Wang | B60H 1/00785 62/176.6 |
| 2014/0265984 A1* | 9/2014 | Hollenbeck | H02P 6/08 318/490 |
| 2015/0177109 A1* | 6/2015 | Lockhart | G01K 13/00 702/182 |

FOREIGN PATENT DOCUMENTS

| | | |
|---|---|---|
| DE | 199 18 161 A1 | 11/2000 |
| DE | 10 2005 035847 A1 | 3/2006 |

\* cited by examiner

INITIALISING SYSTEM FOR A REFRIGERANT COMPRESSOR UNIT AND METHOD FOR INITIALISING A REFRIGERANT COMPRESSOR UNIT

CROSS-REFERENCE TO RELATED PATENT APPLICATION

This application is a continuation of International application number PCT/EP2016/055466 filed on Mar. 14, 2016.

This patent application claims the benefit of International application No. PCT/EP2016/055466 of Mar. 14, 2016, the teachings and disclosure of which are hereby incorporated in their entirety by reference thereto.

BACKGROUND OF THE INVENTION

The invention relates to a refrigerant compressor unit, including a refrigerant compressor, an electrical drive motor for the refrigerant compressor and a compressor controller that determines the voltage and speed of the drive motor on the basis of a set of parameters loaded into this compressor controller and controls the drive motor accordingly.

Hitherto, refrigerant compressor units of this kind have been devised such that, depending on the construction thereof, configuration parameters are generated by the user individually.

The extent to which these configuration parameters are optimal or suboptimal for the respective refrigerant compressor and/or the electrical drive motor is left to the user. Further, when parameters are input, there is a multiplicity of possible ways in which the user can make an error.

The object of the invention is therefore to provide an initialising system for refrigerant compressor units of this kind that enables operation of the refrigerant compressor unit that is as optimal as possible for the respective user.

SUMMARY OF THE INVENTION

This object is achieved by an initialising system for a refrigerant compressor unit mentioned in the introduction, wherein according to the invention the initialising system has a compressor data memory, in which compressor data relating to respectively possible refrigerant compressors are stored, and a motor data memory, in which motor data relating to possible drive motors are stored, wherein the initialising system has a processor for performing the initialisation, a display unit and an input unit for a person operating the system, wherein during initialisation the display unit and the input unit serve to determine the refrigerant compressor and the drive motor, and wherein the processor uses the compressor data of the determined refrigerant compressor and uses the motor data of the determined drive motor to generate compressor configuration parameters and motor configuration parameters and loads them into the compressor controller for the purpose of operating the drive motor.

The advantage of the solution according to the invention can thus be seen in the fact that it provides the possibility of making compressor configuration parameters for every possible compressor and motor configuration parameters for every possible drive motor available to the user, and these together enable optimal operation of the refrigerant compressor unit.

Here, it is particularly advantageous if the compressor configuration parameters and the motor configuration parameters are parameters that are generated and made available by the manufacturer and enable reliable operation of both the refrigerant compressor and the drive motor that is error-free in the long term.

More detailed statements have not yet been made as regards the determination of the refrigerant compressor and the drive motor.

For example, it would be conceivable to perform the determination of the refrigerant compressor by entering it in a field manually.

A particularly favourable solution provides for the processor to generate a list of compressors from the compressor data and to display it on the display unit.

Generation of a compressor list and display of this compressor list on the display unit ensures a greater level of convenience and reliability, since on the one hand only refrigerant compressors that are provided by the initialising system are displayed in the compressor list, and moreover a greater level of convenience is provided by the fact that a person operating the system need only determine the refrigerant compressor of the refrigerant compressor unit from an already predetermined compressor list.

In particular here, it is provided for one of the refrigerant compressors in the compressor list to be determinable using the input unit.

Preferably, the refrigerant compressor in the compressor list is determined in this way in that the respective determined refrigerant compressor is markable in the compressor list by the input unit, for example by setting a marker or by clicking on it.

In order to find in the compressor list the compressor configuration parameters that are suitable for the determined refrigerant compressor, it is preferably provided for the processor to use the compressor data to generate the compressor configuration parameters that belong to the determined refrigerant compressor.

As regards loading the compressor configuration parameters into the compressor controller, it would in principle be conceivable for the compressor configuration parameters to be loaded into the compressor controller automatically by the processor once they have been generated.

However, to give the person operating the system certainty of which compressor configuration parameters have actually been loaded or are being loaded into the compressor controller, it is preferably provided for the processor to load the compressor configuration parameters into the compressor controller after confirmation thereof using the input unit.

This may be done by displaying the compressor configuration parameters on the display unit again, or indeed merely by a prompt, for confirmation of loading the compressor configuration parameters, appearing on the display unit.

Preferably, the processor takes a form such that it is able to reload compressor configuration parameters that are stored in the compressor controller into the initialising system, in order to check them and where appropriate to display them on the display unit.

Particularly advantageous is a solution in which the processor compares the compressor configuration parameters with compressor configuration parameters that are stored in the compressor controller and, in the event of discrepancies, indicates the discrepancy by a warning signal and for example lists it.

For the purpose of performing the comparison, the compressor configuration parameters that are stored in the compressor controller are thus favourably reloaded from the compressor controller by the processor.

This solution has the advantage that it allows erroneous configurations to be discovered in a simple manner and eliminated, so it can further improve user friendliness.

Moreover, more detailed statements have not been made as regards the determination of the drive motor either.

Here, an advantageous solution provides for the processor to generate a list of motors from the motor data and to display it on the display unit.

Here too, on the one hand the reliability of selection is improved, since only drive motors that are suitable for the refrigerant compressor unit are displayed on the display unit, and moreover convenience is improved, since a person operating the system does not have to input such drive motors explicitly.

However, it is particularly favourable if the processor selects drive motors from the motor data that, on the basis of the compressor data, are suitable for the determined refrigerant compressor, for example are available from the manufacturer, and displays them in the motor list on the display unit.

In this case, the convenience when operating the initialising system is markedly further improved if it is already possible to infer from the compressor data which drive motors are suitable for the respective refrigerant compressor, so that it is not possible to make an erroneous association between the drive motor and the refrigerant compressor.

For the purpose of determining the respective drive motor from the motor list, it is preferably provided for one of the drive motors from the motor list to be determinable using the input unit.

Thus, it is only possible for the person operating the system to select a drive motor that is suitable for the already determined refrigerant compressor in a simple manner, without the possibility that errors occur in the selection of the drive motor.

Here, the determination is for example performed in that the respective drive motor to be determined is marked in the motor list by a symbol or is clicked on.

In order to find the suitable motor configuration parameters, it is preferably provided for the processor to use the motor data to generate the motor configuration parameters that belong to the determined drive motor.

Here, the motor configuration parameters may already be stored in the motor data, or it is possible to use the motor data of the determined drive motor as the basis for finding the corresponding motor configuration parameters as a file in the data memory.

As regards loading the motor configuration parameters into the compressor controller, it would likewise be conceivable for the motor configuration parameters to be loaded automatically by the processor once they have been generated.

However, to inform the person operating the system of which motor configuration parameters have been loaded into the compressor controller with reliability and certainty, it is preferably provided for the processor to load the motor configuration parameters into the compressor controller after confirmation thereof using the input unit.

Preferably, the processor takes a form such that it is able to reload the motor configuration parameters that are stored in the compressor controller into the initialising system, in order to check them and where appropriate to display them on the display unit.

It is particularly advantageous if the processor compares the motor configuration parameters with motor configuration parameters that are stored in the compressor controller and, in the event of discrepancies, indicates the discrepancies by a warning signal and for example lists them.

For the purpose of performing the comparison, the motor configuration parameters that are stored in the compressor controller are thus favourably reloaded from the compressor controller by the processor.

This solution has the advantage that it allows erroneous configurations to be discovered in a simple manner and eliminated, so it can further improve user friendliness.

In describing the individual exemplary configurations so far, reference has only been made to the compressor configuration parameters and the motor configuration parameters.

These represent the minimum requirement for suitable operation of the refrigerant compressor unit.

However, operation of the refrigerant compressor unit can be further optimised if information on the refrigerant used in the refrigerant circuit is provided, since the refrigerant also has an effect on how the refrigerant compressor is to be operated by the drive motor.

For this reason, a further advantageous solution provides for the processor to generate a list of refrigerants from refrigerant data stored in a refrigerant data memory and to display it on the display unit.

For the purpose of determining the refrigerant used, it is preferably provided for one of the refrigerants from the refrigerant list to be determinable using the input unit.

It is also possible to determine the refrigerant from the refrigerant list in a simple manner in that the refrigerant is marked in the list.

It is particularly favourable if the processor generates the refrigerant configuration parameters that belong to the determined refrigerant using the refrigerant data.

The refrigerant configuration parameters are also either already present in the refrigerant data or findable using the refrigerant data in the refrigerant data memory.

In principle, the refrigerant configuration parameters could represent a finalised parameter set for the compressor controller.

In many cases, however, it is still possible with the refrigerant configuration parameters associated with a refrigerant to vary or select or deselect individual parameters.

The refrigerant configuration parameters include for example not only specific refrigerant parameters, such as in particular at least one of the following parameters: critical pressure, critical temperature and coefficients for converting the pressures to temperatures, but also system or plant parameters related to the refrigerant, such as in particular at least one of the following parameters: evaporation and/or condensation point, temperature and/or pressure limit values that can be adapted within limits and which can thus be varied, selected or deselected.

For this reason, it is preferably provided for the processor to extract selection parameters from the refrigerant configuration parameters of the determined refrigerant and to display them on the display unit.

This provides the possibility of alerting a person operating the system to the parameters in the refrigerant configuration parameters that are not unambiguous, being still present as variable selection parameters, and of giving the person the option of determining them.

Here, it is particularly favourable if the displayed selection parameters are determinable using the input unit.

For the purpose of loading the refrigerant configuration parameters, it is favourably provided for the processor to load the refrigerant configuration parameters, in particular together with the determined selection data, into the plant controller after confirmation thereof using the input unit.

Preferably, the processor takes a form such that it is able to reload the refrigerant configuration parameters stored in the compressor controller into the initialising system in order to check them and where appropriate to display them on the display unit.

It is particularly advantageous if the processor compares the refrigerant configuration parameters with refrigerant configuration parameters that are stored in the compressor controller and, in the event of discrepancies, indicates the discrepancies by a warning signal and for example lists them.

For the purpose of performing the comparison, favourably the refrigerant configuration parameters that are stored in the compressor controller are thus reloaded from the compressor controller by the processor.

This solution has the advantage that it allows erroneous configurations to be discovered in a simple manner and eliminated, so it can further improve user friendliness.

The compressor configuration parameters, the motor configuration parameters and the refrigerant configuration parameters may be loaded into the compressor controller either after they have each been generated, or simultaneously.

More detailed statements have not yet been made as regards the form taken by the compressor data memory, the motor data memory and the refrigerant data memory.

Here, an advantageous solution provides for the compressor data memory, the motor data memory and the refrigerant data memory to be formed in a data memory unit.

Here, the data memory unit may be any kind of data memory unit, such as an area of a hard disk, or a memory card.

So that the compressor data, the motor data and the refrigerant data can be updated in a simple manner, it is preferably provided for the compressor data and/or the motor data and/or the refrigerant data in the data memory unit to be updatable by connecting to an external server.

In this case, the external server is for example operated by the manufacturer of the refrigerant compressors, and the data available are updated continuously, with the result that the compressor data and/or the motor data and/or the refrigerant data can also be updated in a simple manner.

As an alternative or in addition, it is also possible to input such data manually.

More detailed statements have not yet been made as regards the mode of operation of the compressor controller.

Here, it is preferably provided for the compressor controller to control the drive motor on the basis of at least one of the sets of compressor configuration parameters, motor configuration parameters and refrigerant configuration parameters.

Preferably, it is provided for the compressor controller to operate the refrigerant compressor within defined usage limits, wherein the usage limits result for example from compressor configuration parameters and refrigerant configuration parameters.

In particular, in the construction of the compressor controller it is provided for it to include a frequency converter, which enables the electrical drive motor to be operated in a manner controlled by speed of rotation.

Preferably here, it is provided for the frequency converter to operate on the basis of the loaded compressor configuration parameters and the loaded motor configuration parameters, wherein where appropriate only some of the compressor configuration parameters are required for operating the frequency converter, while where appropriate some of the compressor configuration parameters are required for overall operation of the compressor controller and for example have an effect on a control characteristic of the compressor controller.

Moreover, the invention relates to a method for initialising a refrigerant compressor unit, including a refrigerant compressor, an electrical drive motor for the refrigerant compressor and a compressor controller that determines the voltage and speed of the drive motor on the basis of sets of configuration parameters loaded into this compressor controller and controls the drive motor accordingly, wherein according to the invention possible refrigerant compressors and drive motors are determined from a compressor data memory, in which compressor data for respectively possible refrigerant compressors are stored, and a motor data memory, in which motor data for possible drive motors are stored, for the purpose of initialisation, and wherein compressor configuration parameters and motor configuration parameters are generated by an initialising system using the compressor data of the determined refrigerant compressor and using the motor data of the determined drive motor and are loaded into the compressor controller for the purpose of operating the drive motor.

The advantage of the solution according to the invention likewise, in the same manner as in the case of the initialising system, lies in the fact that on the one hand convenient and error-free generation of the compressor configuration parameters and motor configuration parameters is possible.

It is particularly favourable for the purpose of determining the refrigerant compressor if a list of compressors is generated from the stored compressor data and displayed on the display unit.

In particular, the refrigerant compressor can then be selected in a simple manner in that one of the refrigerant compressors in the compressor list is determined using the input unit.

In order improve the convenience and freedom from error, it is further provided for the compressor configuration parameters that belong to the determined refrigerant compressor to be generated using the compressor data.

It is particularly advantageous for the person operating the system if the compressor configuration parameters are loaded into the compressor controller after confirmation thereof using the input unit, with the result that the person operating the system is aware of which compressor configuration parameters are now present in the compressor controller.

Preferably, it is provided for the compressor configuration parameters stored in the compressor controller to be able to be reloaded into the initialising system so that they can be checked and where appropriate displayed on the display unit.

It is particularly advantageous if the compressor configuration parameters are compared with compressor configuration parameters that are stored in the compressor controller and, in the event of discrepancies, the discrepancies are indicated by a warning signal and for example listed.

For the purpose of performing the comparison, the compressor configuration parameters that are stored in the compressor controller are thus favourably reloaded from the compressor controller by the processor.

This solution has the advantage that it allows erroneous configurations to be discovered in a simple manner and eliminated, so it can further improve user friendliness.

A further advantageous embodiment of the method according to the invention provides for a list of motors to be generated from the motor data and displayed on the display unit, with the result that this likewise simplifies the selection of the drive motor for a person operating the system.

It is particularly favourable if suitable drive motors are selected from the motor data using the compressor data for the determined refrigerant compressor and are displayed in the motor list on the display unit, such that a link is already made between the selected refrigerant compressor and the motors proposed for this refrigerant compressor, and it is thus possible to rule out the possibility that motors that are not suitable for the selected refrigerant compressor are proposed.

For the person operating the system, the selection is further simplified in that a drive motor from the motor list is determined using the input unit, with the result that the selection of the suitable drive motor is made much simpler for the person operating the system.

Further, it is advantageous for a person operating the system if the motor configuration parameters that belong to the determined drive motor are generated using the motor data.

In order to reassure the person operating the system of which motor configuration parameters are loaded into the compressor controller, it is preferably provided for the motor configuration parameters to be loaded into the compressor controller after confirmation thereof using the input unit.

Preferably, it is provided for the motor configuration parameters that are stored in the compressor controller to be able to be reloaded into the initialising system, so that they can be checked and where appropriate displayed on the display unit.

It is particularly advantageous if the motor configuration parameters are compared with motor configuration parameters that are stored in the compressor controller and, in the event of discrepancies, the discrepancies are indicated by a warning signal and for example listed.

For the purpose of performing the comparison, the motor configuration parameters that are stored in the compressor controller are thus favourably reloaded from the compressor controller.

This solution has the advantage that it allows erroneous configurations to be discovered in a simple manner and eliminated, so it can further improve user friendliness.

In the method steps so far, it has not been further specified whether refrigerant data are used or not.

To improve the efficiency of operation of the refrigerant compressor unit that is controlled by the compressor controller, it is advantageous if a list of refrigerants is generated from refrigerant data stored in a refrigerant data memory and is displayed on the display unit.

Thus, determination of the refrigerant is simplified in the same way as in the case of determining the refrigerant compressor and the drive motor.

Preferably in this connection, it is provided for a refrigerant from the refrigerant list to be determined using the input unit, with the result that the person operating the system is presented with the suitable refrigerants and thus it is possible to avoid the possibility that the person operating the system will select an unsuitable refrigerant.

In order to arrive at the required refrigerant configuration parameters appropriately, it is preferably provided for the refrigerant configuration parameters that belong to the determined refrigerant to be generated using the refrigerant data.

In many cases, the refrigerant configuration parameters are not determined in finalised form, with the result that where appropriate some of the refrigerant configuration parameters are still either entirely freely or at least to a certain extent selectable.

The refrigerant configuration parameters include for example not only specific refrigerant parameters, such as in particular at least one of the following parameters: critical pressure, critical temperature and coefficients for converting the pressures to temperatures, but also system or plant parameters related to the refrigerant, such as in particular at least one of the following parameters: evaporation and/or condensation point, temperature and/or pressure limit values that can be adapted within limits and which can thus be varied, selected or deselected.

For this reason, it is preferably provided for selection parameters to be extracted from the refrigerant configuration parameters and displayed on the display unit.

For this purpose, it is preferably provided for the displayed selection parameters to be determined using the input unit, wherein the displayed selection parameters are determined either by inputting concrete possible values or by selecting individual values using marking.

As regards loading the refrigerant configuration parameters, it would in principle be possible to load them after they have been determined.

However, in order to inform a person operating the system of which refrigerant configuration parameters have been loaded, it is preferably provided for the refrigerant configuration parameters, in particular together with the selection parameters, to be loaded into the compressor controller after a confirmation thereof using the input unit.

Here, loading may be confirmed merely by a prompt window, or it is provided for the refrigerant configuration parameters and where appropriate the selection parameters to be displayed on the display unit and then for these values to be confirmed using the input unit.

Preferably, it is provided for the refrigerant configuration parameters that are stored in the compressor controller to be able to be reloaded into the initialising system so that they can be checked and where appropriate displayed on the display unit.

It is particularly advantageous if the processor compares the refrigerant configuration parameters with refrigerant configuration parameters that are stored in the compressor controller and, in the event of discrepancies, indicates the discrepancies by a warning signal and for example lists them.

For the purpose of performing the comparison, favourably the refrigerant configuration parameters that are stored in the compressor controller are reloaded from the compressor controller by the processor.

This solution has the advantage that it allows erroneous configurations to be discovered in a simple manner and eliminated, so it can further improve user friendliness.

Further features and advantages form the subject matter of the description below and the representation in the drawing of some exemplary embodiments.

DETAILED DESCRIPTION OF THE INVENTION

Figure 1:
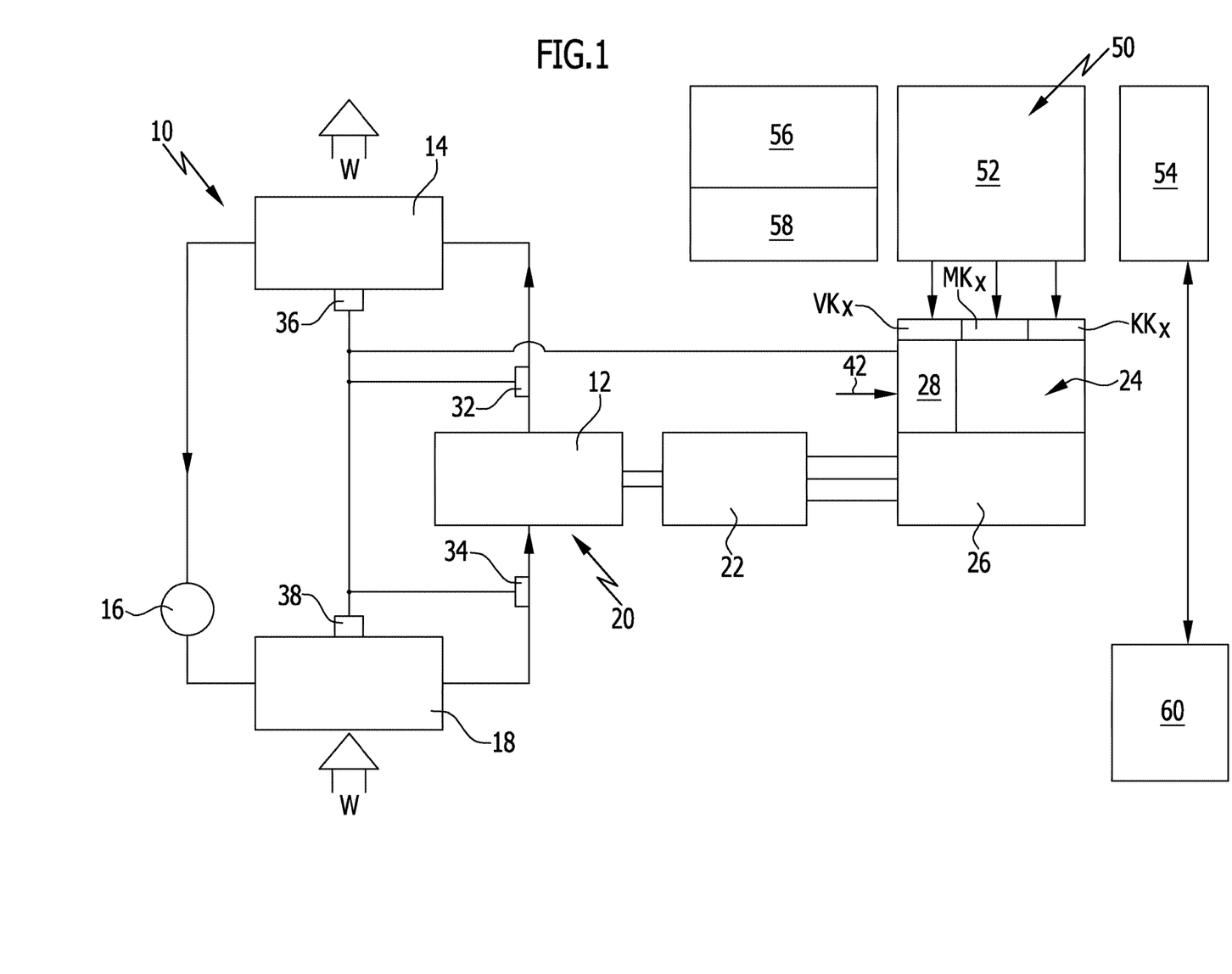
FIG. 1 shows a schematic illustration of a refrigerant circuit with a refrigerant compressor unit and an initialising unit.

In a refrigerant circuit, which is illustrated in FIG. 1 and is designated 10 as a whole, there is arranged a refrigerant compressor 12 that compresses refrigerant guided in the refrigerant circuit 10 and supplies it to a heat exchanger unit 14 in which the refrigerant, which is heated by being compressed in the refrigerant compressor 12, undergoes cooling by the discharge of heat W.

The refrigerant that has then been cooled by the heat exchanger unit 14 is supplied therefrom to an expansion member 16 in which the refrigerant is expanded, wherein the refrigerant is thereafter supplied to a heat exchanger unit 18 in which the expanded refrigerant is able to take up heat W and thus cool the heat-discharging medium.

The refrigerant that is heated in the heat exchanger 18 is then supplied to the refrigerant compressor 12 again.

The refrigerant compressor 12 is part of a refrigerant compressor unit, which is designated 20 as a whole and has, in addition to the refrigerant compressor 12, a drive motor 22, which drives the refrigerant compressor 12 by a mechanical coupling; moreover, the refrigerant compressor unit 20 includes a compressor controller 24 that, for its part, has a converter 26 for controlling the drive motor 22 by speed control, and in particular where appropriate a control unit 28 is also controlled, wherein the control unit 28 may be an integral or a separate unit.

The control unit 28 uses for example one or more sensors 32 to 38 to detect a pressure and/or temperature in the refrigerant circuit 10, wherein for example the sensors 32 and 24 are pressure sensors or indeed temperature sensors, for example for detecting the initial pressure or input pressure, or the initial temperature or input temperature, of the refrigerant compressor 12, and wherein for example the sensors 36 and 38 are temperature sensors, for example for detecting the temperature of the heat exchanger unit 14 and the temperature of the heat exchanger unit 18 respectively.

It is also possible for the control unit 28 to operate on the basis of an external control signal, however.

So that the refrigerant compressor 12 and the drive motor 22 can be driven optimally and in an operationally reliable manner by the compressor controller 24, in particular the converter 26, with optimal speed control and optimised energy, the voltage provided by the converter 26, the current generated by the converter 26 and also the time characteristic thereof—that is to say the frequency or speed of rotation—in relation to the speed-controlled operation of the drive motor 22 have to be adapted on the one hand to the configuration of the refrigerant compressor 12 and on the other to the configuration of the drive motor 22.

Figure 2:
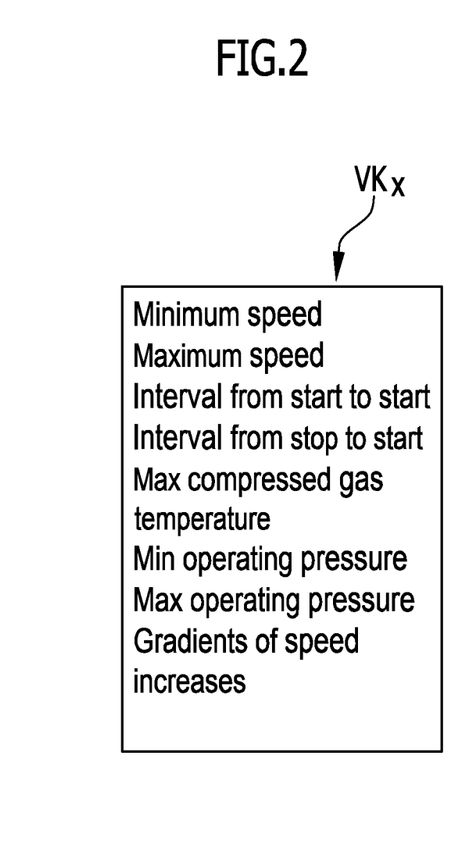
FIG. 2 shows an exemplary illustration of possible compressor configuration parameters.

Here, the refrigerant compressor 12 is defined by so-called compressor configuration parameters VKx, which include for example at least one or more of the following parameters: minimum speed, maximum speed, interval from start to start, interval from stop to start, maximum temperature of compressed gas, minimum operating pressure, maximum operating pressure, maximum possible gradients of the possible speed increases, and refrigerant data (FIG. 2).

Figure 3:
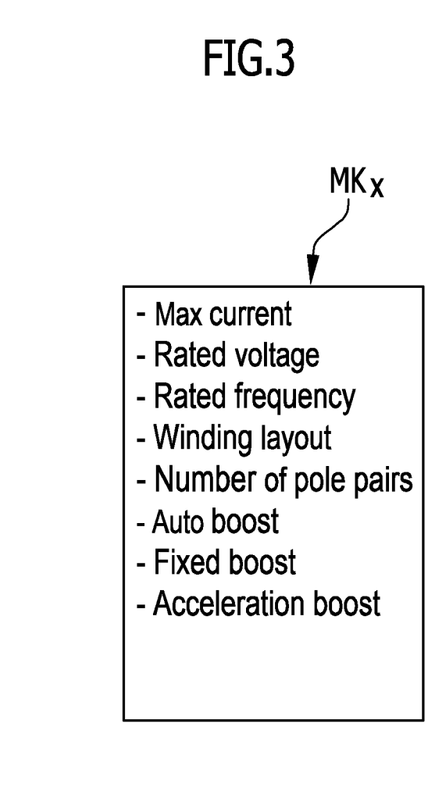
FIG. 3 shows an exemplary illustration of possible motor configuration parameters.

Moreover, it is necessary to predetermine motor configuration parameters MKx for the drive motor 22, which include for example at least one or more of the following parameters: maximum current, rated voltage, rated frequency, in particular ratio of voltage to frequency, and where appropriate winding layout and characteristic, for example represented by the motor equivalent circuit diagram, number of pole pairs, commenting method, and auto, fixed and acceleration boost (FIG. 3).

Figure 4:
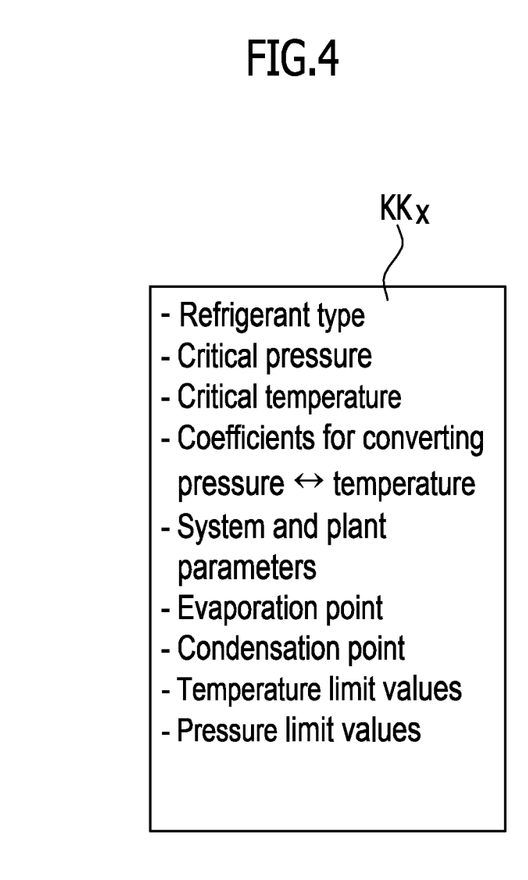
FIG. 4 shows an illustration of possible refrigerant configuration parameters.

Moreover, refrigerant configuration parameters KKx are preferably predetermined for the compressor controller 24, which include for example at least one or more of the following parameters: refrigerant type, critical pressure, critical temperature, coefficients for converting pressure to temperature, and parameters relating to the system or plant, such as evaporation point, condensation point, temperature limit values and pressure limit values (FIG. 4).

The compressor configuration parameters VKx, motor configuration parameters MKx and refrigerant configuration parameters KKx have to be loaded into the compressor controller 24 such that the compressor controller 24 having the converter 26 corresponding to these configuration parameters is able to operate the refrigerant compressor 12 optimally in the respective operating states, in particular within provided usage limits, using the drive motor 22.

So that one and the same compressor controller 24 can be used for the most diverse combinations of drive motor 22 and refrigerant compressor 12 of the respective refrigerant compressor unit 20, according to the invention an initialising system, designated 50 as a whole in FIG. 1, and including a processor 52, a data memory unit 54, a display unit 56 and an input unit 58 is provided.

Preferably, the data memory unit 54 includes a compressor data memory 54V, a motor data memory 54M and a refrigerant data memory 54K, which may either be separate memories or are grouped into a single memory unit.

Here, the data memory unit 54 may be a hard disk on a computer, or a memory card holding these data.

For the purpose of storing and/or updating the compressor data, the motor data MD and/or the refrigerant data KD, preferably a connection is establishable over the internet between the data memory unit 54 and a server 60, wherein the data are kept continuously updated on the server 60, for example by the manufacturer of the refrigerant compressor 12 and/or the drive motor 22.

The initialising system 50 may be provided as a separate system that communicates with the compressor controller 24 only for the purpose of initialisation, or it is conceivable to group the initialising system 50 and the compressor controller 24 together permanently to form one unit.

An initialising system 50 of this kind makes it possible to determine the compressor configuration parameters VKx, the motor configuration parameters MKx and where appropriate refrigerant configuration parameters KKx in accordance with the refrigerant compressor 12 used in the refrigerant compressor unit 20, the electrical drive motor 22 used, and the refrigerant used in the refrigerant circuit 10 and to load them into the compressor controller 24 such that the compressor controller 24 is able to operate the refrigerant compressor unit 20 on the basis of these parameters.

Figure 5A:
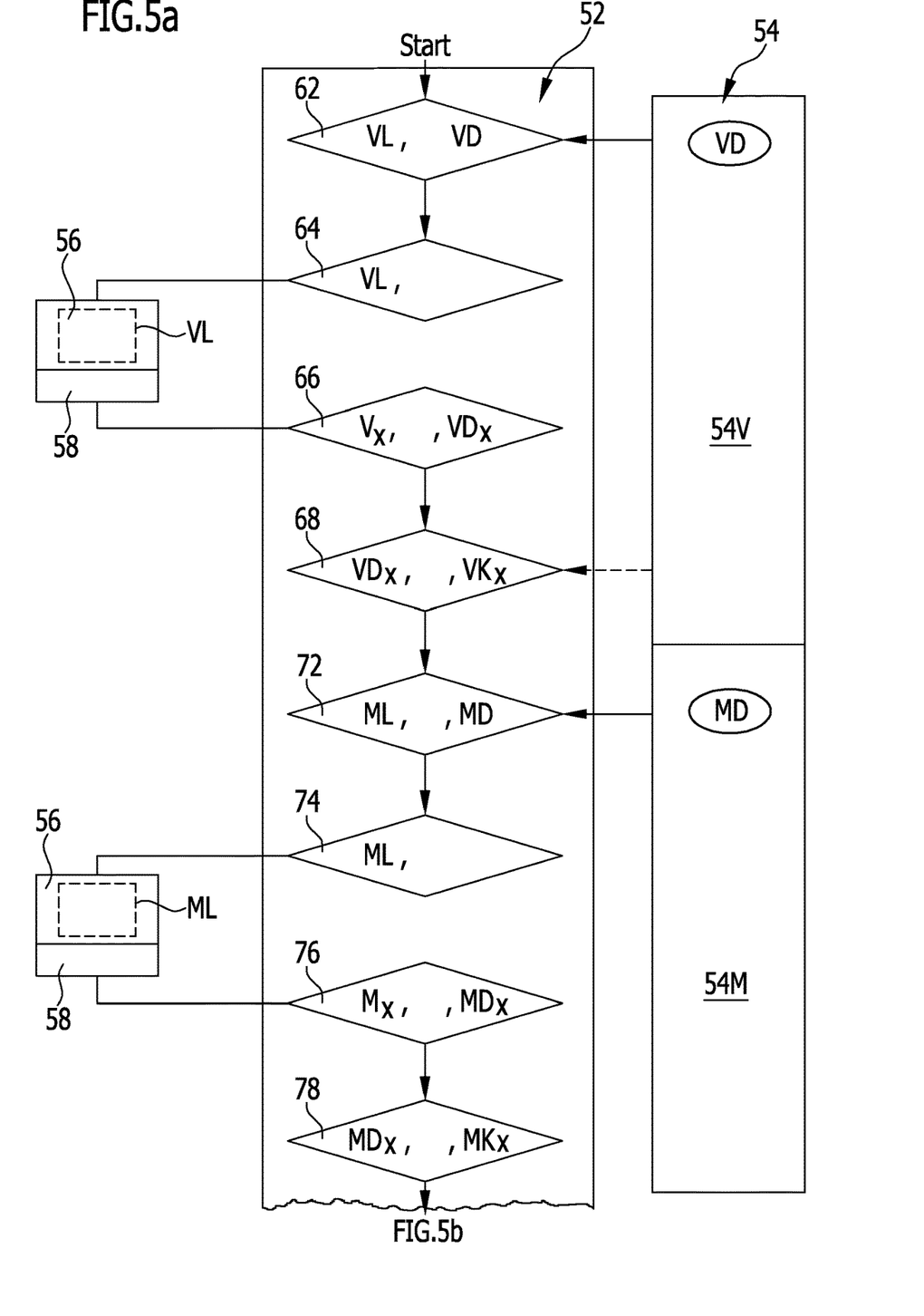
FIGS. 5a, b show an exemplary flow chart for the mode of operation of a first exemplary embodiment of an initialising system according to the invention.
Figure 5B:
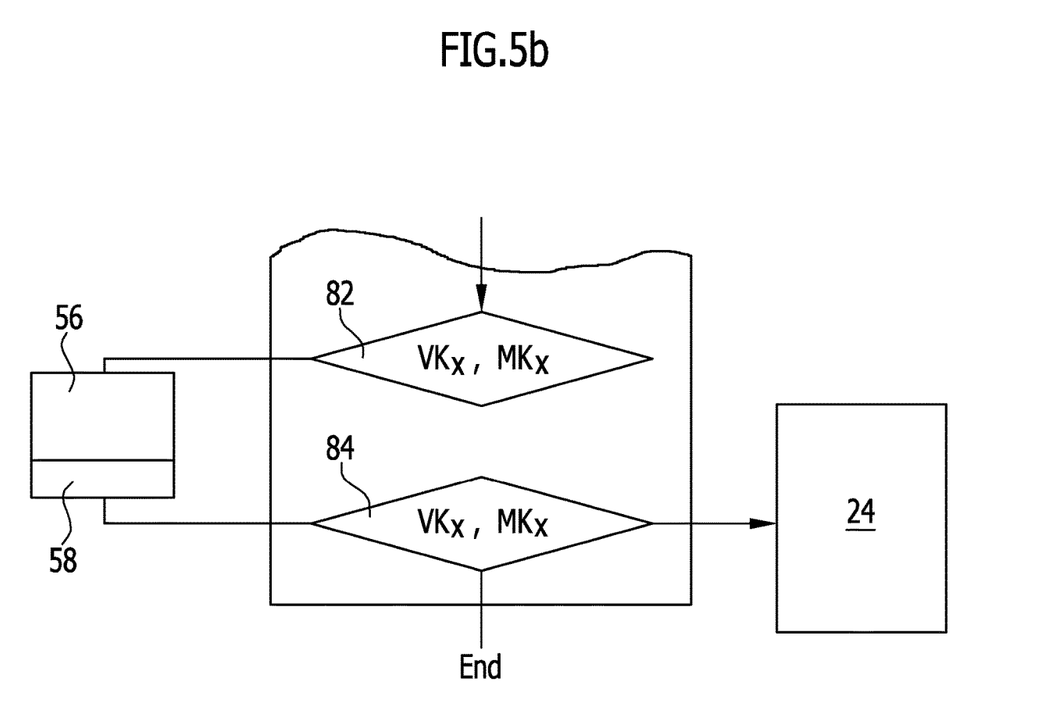

A first exemplary embodiment of a method executed by the processor 52 is illustrated by way of example in FIG. 5.

After the start, in a first step 62 the processor 52 uses compressor data VD stored in a compressor data memory 54V of the data memory unit 54 to generate a compressor list VL, which contains the possible refrigerant compressors that may be used as a refrigerant compressor 12 in the refrigerant compressor unit 20.

In a second step 64, the compressor list VL is displayed on the display unit 56, and a person operating the system has the option, using the input unit 58 and by marking it, of determining the refrigerant compressor 12 that is used or is to be used in the refrigerant compressor unit 20.

In a third step 66, the processor 52 detects which refrigerant compressor Vx out of the compressor list VL has been determined by input through the input unit 58, and is thus able in the next step 68, using the compressor data VDx that belong to this refrigerant compressor Vx, to determine the compressor configuration parameters VKx, which are either part of the compressor data VDx or are stored separately in the data memory unit 54.

In the next step 72, the processor 52 generates, from the motor data MD that are stored in a motor data memory 54M of the data memory unit 54, a motor list ML which, in the next step 74, is displayed on the display unit 56 as a motor list ML, wherein a person operating the system has the option, using the input unit 58, of determining from the motor list ML a drive motor Mx that is used or is to be used in the refrigerant compressor unit 20, wherein the motor data MDx belong to this motor Mx from the motor list ML.

In the next step 78, the processor 52 generates the motor configuration parameters MKx using the motor data MDx.

If no refrigerant data are required or are to be input, in the next step 82 there is displayed on the display unit 56 either the prompt as to whether the compressor configuration parameters VKx and the motor configuration parameters MKx are to be loaded into the compressor controller 24, or, for the sake of additional confirmation, the compressor configuration parameters VKx and the motor configuration parameters MKx are displayed on the display unit 56, and after confirmation by the person operating the system using the input unit 58, in the step 84 the compressor configuration parameters VKx and the motor configuration parameters MKx are loaded into the compressor controller 24, such that the compressor controller 24 is provided with the configuration parameters required for operating the refrigerant compressor unit 20 with the respective refrigerant compressor 12 and the respective drive motor 22.

In a variant of the first exemplary embodiment of the method performed by the processor 52, the processor 52 takes a form such that it is able to reload the compressor configuration parameters and motor configuration parameters that are stored in the compressor controller 24 into the initialising system 50, in order to check them and where appropriate to display them on the display unit 56.

As an additional step for this purpose, for example in this variant in step 82, it is provided for the processor 52 to compare the compressor configuration parameters VKx with compressor configuration parameters stored in the compressor controller 24 and, in the event of discrepancies, to indicate the discrepancies by a warning signal on the display unit 56 and for example to list them on the display unit 56, wherein for the purpose of performing the comparison the compressor configuration parameters stored in the compressor controller 24 are reloaded from the compressor controller 24 by the processor.

Similarly, for example in this variant in step 82, it is provided for the processor 52 to compare the motor configuration parameters MKx with motor configuration parameters stored in the compressor controller 24 and, in the event of discrepancies, to indicate the discrepancies by a warning signal on the display unit 56 and for example to list them on the display unit 56, wherein for the purpose of performing the comparison the motor configuration parameters stored in the compressor controller 24 are reloaded from the compressor controller 24 by the processor.

This solution has the advantage that that it allows erroneous configurations to be discovered in a simple manner and eliminated, so it can further improve user friendliness.

Figure 6A:
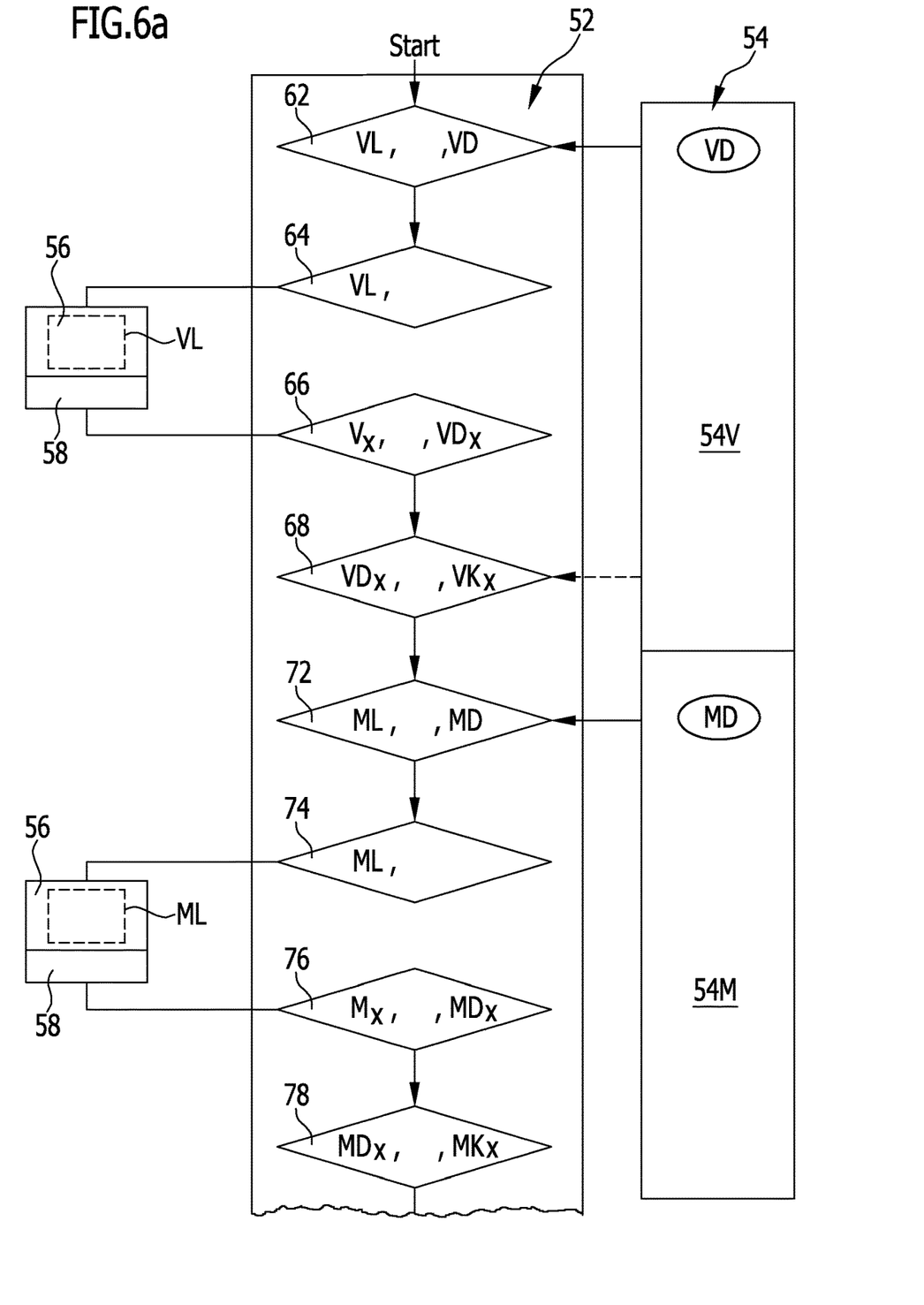
FIGS. 6a, b show a flow chart of a second exemplary embodiment of an initialising system according to the invention.
Figure 6B:
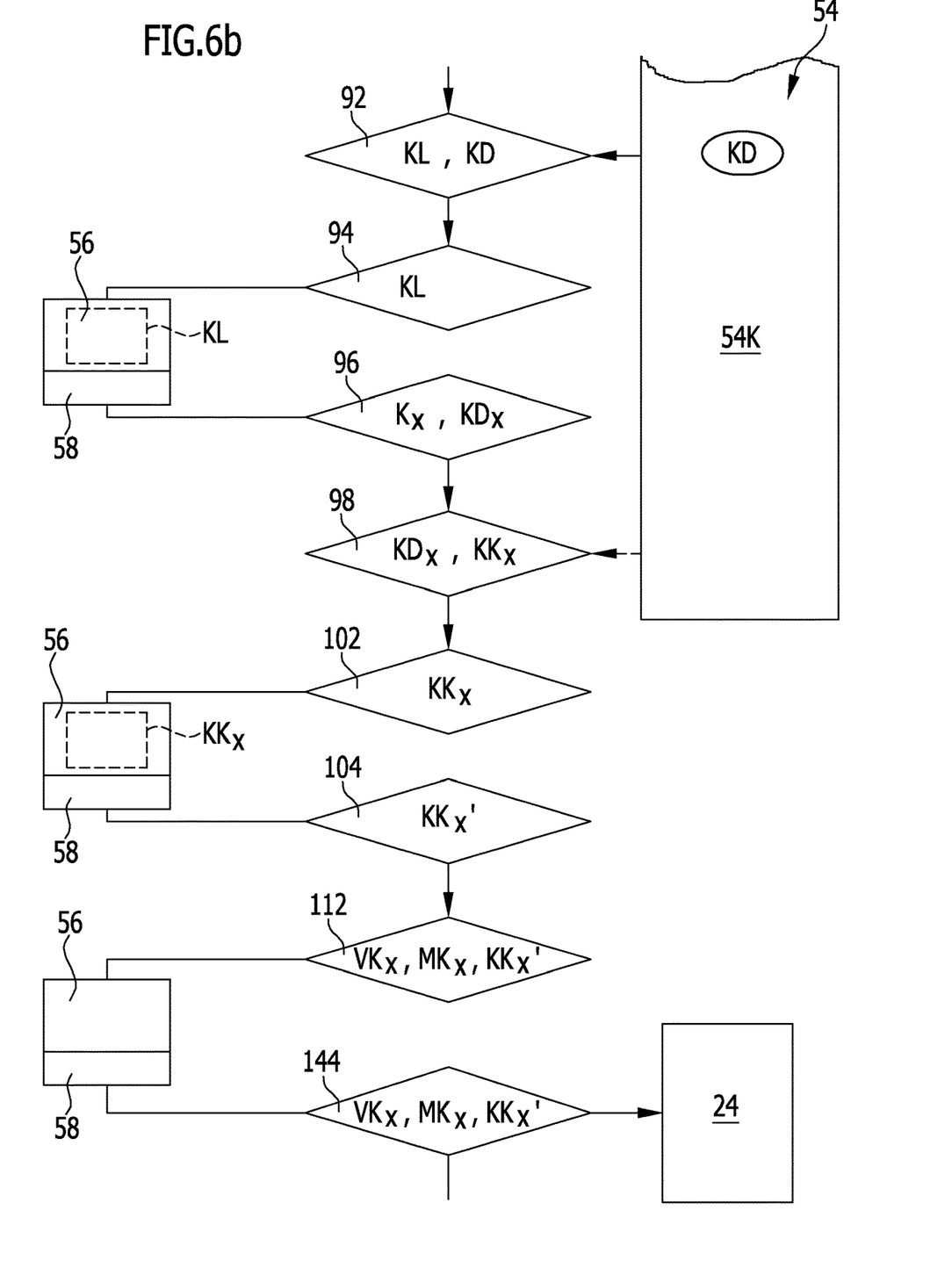

In a second exemplary embodiment of a method according to the invention, illustrated in FIG. 6, the steps 62 to 78 are identical to those of the first exemplary embodiment, according to FIG. 5.

However, in the second exemplary embodiment, the step 78 is followed in a step 92 by loading refrigerant data KD from a refrigerant data memory 54K of the data memory unit 54 and generating a refrigerant list KL.

In a subsequent step 94, the refrigerant list KL is displayed on the display unit 56, and the person operating the system has the option, using the input unit, of selecting the refrigerant Kx from the refrigerant list 94.

This is detected in the step 96, and the refrigerant data KDx are associated with the selected refrigerant Kx.

In the next step 98, the refrigerant configuration parameters KKx that belong to the refrigerant data KDx are determined.

If the refrigerant configuration parameters KKx for the respective refrigerant are complete, then, analogously to the steps 82 and 84 in the first exemplary embodiment, they can be displayed on the display unit 56 and, once a person operating the system makes an appropriate input in the input unit 58, the compressor configuration data VKx, the motor configuration data MKx and the refrigerant configuration data KKx can be loaded into the compressor controller 24.

If, however, there are still open or incomplete parameters—so-called selection parameters—among the refrigerant configuration parameters KKx, then in the step 102 the selection parameters of the refrigerant configuration parameters KKx are displayed on the display unit 56, and there is an option, using the input unit 58, to complete the refrigerant configuration parameters KKx.

In the step 104, the processor 52 detects the refrigerant configuration parameters KKx' completed using the input unit 58.

In the step 112, the processor 52 then displays the compressor configuration parameters VKx, the motor configuration parameters MKx and the completed refrigerant configuration parameters KKx' on the display unit 58, either individually or in summary form, such that the person operating the system has the option of giving the instruction to release loading of these configuration parameters, using the input unit 58, such that in the step 144 the compressor configuration parameters VKx, the motor configuration parameters MKx and the completed refrigerant configuration parameters KKx' are loaded into the compressor controller 24.

Moreover, in a variant of the second exemplary embodiment of the method executed by the processor 52, the processor takes a form such that it is able to reload the compressor configuration parameters that are stored in the compressor controller 24, the motor configuration parameters and the refrigerant configuration parameters into the initialising system 50, in order to check them and where appropriate to display them on the display unit 56.

As an additional step for this purpose, for example in this variant of the second exemplary embodiment in step 112, it is provided for the processor 52 to compare the compressor configuration parameters VKx with compressor configuration parameters stored in the compressor controller 24 and, in the event of discrepancies, to indicate the discrepancies by a warning signal on the display unit 56 and for example to list them on the display unit 56, wherein for the purpose of performing the comparison the compressor configuration parameters stored in the compressor controller 24 are reloaded from the compressor controller 24 by the processor.

Similarly, for example in this variant in step 112, it is provided for the processor 52 to compare the motor configuration parameters MKx with motor configuration parameters stored in the compressor controller 24 and, in the event of discrepancies, to indicate the discrepancies by a warning signal on the display unit 56 and for example to list them on the display unit 56, wherein for the purpose of performing the comparison the motor configuration parameters stored in the compressor controller 24 are reloaded from the compressor controller 24 by the processor 52.

Further, for example in this variant in step 112, it is provided for the processor 52 to compare the refrigerant configuration parameters KKx' with refrigerant configuration parameters stored in the compressor controller 24 and, in the event of discrepancies, to indicate the discrepancies by a warning signal on the display unit 56 and for example to list them on the display unit 56, wherein for the purpose of performing the comparison the refrigerant configuration parameters stored in the compressor controller 24 are reloaded from the compressor controller 24 by the processor 52.

This solution has the advantage that it allows erroneous configurations to be discovered in a simple manner and eliminated, so it can further improve user friendliness.

The invention claimed is:

1. A method for initializing operation of a refrigerant compressor unit, which initialized refrigerant compressor unit shall include a refrigerant compressor, an electrical drive motor for the refrigerant compressor and a compressor controller that determines the voltage and speed of the drive motor on the basis of sets of configuration parameters loaded into this compressor controller and controls the drive motor accordingly, said method by use of an initializing system for the purpose of installation in said refrigerant compressor unit comprising the step of determining the refrigerant compressors from a compressor data memory, in which compressor data for a selection of potential refrigerant compressors is stored, and the step of determining the drive motor, operative together with the determined compressor from a motor data memory, in which motor data for a selection of potential drive motors are stored, and for the purpose of initialisation, and the step of generating compressor configuration parameters and motor configuration parameters by an initialising system using the compressor data of the determined refrigerant compressor and using the motor data of the determined drive motor and loading these data into the compressor controller for the purpose of operating the drive motor.

2. The method according to claim 1, wherein a list of compressors is generated from the stored compressor data and displayed on the display unit.

3. The method according to claim 2, wherein one of the refrigerant compressors in the compressor list is determined using the input unit.

4. The method according to claim 1, wherein the compressor configuration parameters that belong to the determined refrigerant compressor are generated using the compressor data.

5. The method according to claim 4, wherein the compressor configuration parameters are loaded into the compressor controller after confirmation thereof using the input unit.

6. The method according to claim 1, wherein a list of motors is compiled from the motor data and displayed on the display unit.

7. The method according to claim 1, wherein suitable drive motors are selected from the motor data using the compressor data for the determined refrigerant compressor and are displayed in the motor list on the display unit.

8. The method according to claim 6, wherein a drive motor from the motor list is determined using the input unit.

9. The method according to claim 8, wherein the motor configuration parameters that belong to the determined drive motor are generated using the motor data.

10. The method according to claim 9, wherein the motor configuration parameters are loaded into the compressor controller after confirmation thereof using the input unit.

11. The method according to claim 1, wherein a list of refrigerants is generated from refrigerant data stored in a refrigerant data memory and is displayed on the display unit.

12. The method according to claim 11, wherein a refrigerant from the refrigerant list is determined using the input unit.

13. The method according to claim 1, wherein the refrigerant configuration parameters that belong to the determined refrigerant are compiled using the refrigerant data.

14. The method according to claim 13, wherein selection parameters are extracted from the refrigerant configuration parameters and displayed on the display unit.

15. The method according to claim 14, wherein the displayed selection parameters are determined using the input unit.

16. The method according to claim 13, wherein the refrigerant configuration parameters, in particular together with the marked selection parameters, are loaded into the compressor controller after a confirmation thereof using the input unit.

* * * * *